United States Patent [19]
Chen

[11] Patent Number: 5,661,798
[45] Date of Patent: Aug. 26, 1997

[54] BACK CLIP STRUCTURE OF A MOBILE PHONE

[75] Inventor: Tonny Chen, Changhua, Taiwan

[73] Assignee: E. Lead Electronic Co., Ltd., Chang-hua, Taiwan

[21] Appl. No.: 596,916

[22] Filed: Mar. 13, 1996

[51] Int. Cl.⁶ ................................. H04M 1/00
[52] U.S. Cl. ............... 379/454; 379/455; 379/446
[58] Field of Search .................. 379/446, 426, 379/454, 455, 428, 449; 455/89, 90, 128; 224/929, 930

[56] References Cited

U.S. PATENT DOCUMENTS

| 4,998,277 | 3/1991 | Rioux, Jr. ............... | 379/454 |
| 5,475,752 | 12/1995 | Mischenko ............... | 379/434 |

Primary Examiner—Jack K. Chiang

[57] ABSTRACT

A back clip structure for a mobile phone, including a main body, a clip member and a stand. The main body is formed with a restricting seat and an engaging slot for fitting with the clip member. The clip member has a first face formed with an inner recess for placing the stand therein and a second face disposed with a support arm for inserting into the restricting seat of the main body. A row of tooth blocks are disposed on the surface of the inner recess for engaging with the stand. The stand is placed in the inner recess of the clip member to support the mobile phone in an upright state. The stand is slidable along the slide channels for height adjustment. When used with a mobile phone case, the main body is disassembled from the clip member, permitting the mobile phone to be fitted into the mobile phone case. The main body and the clip member have the same height so that the charging operation will not be affected.

2 Claims, 4 Drawing Sheets

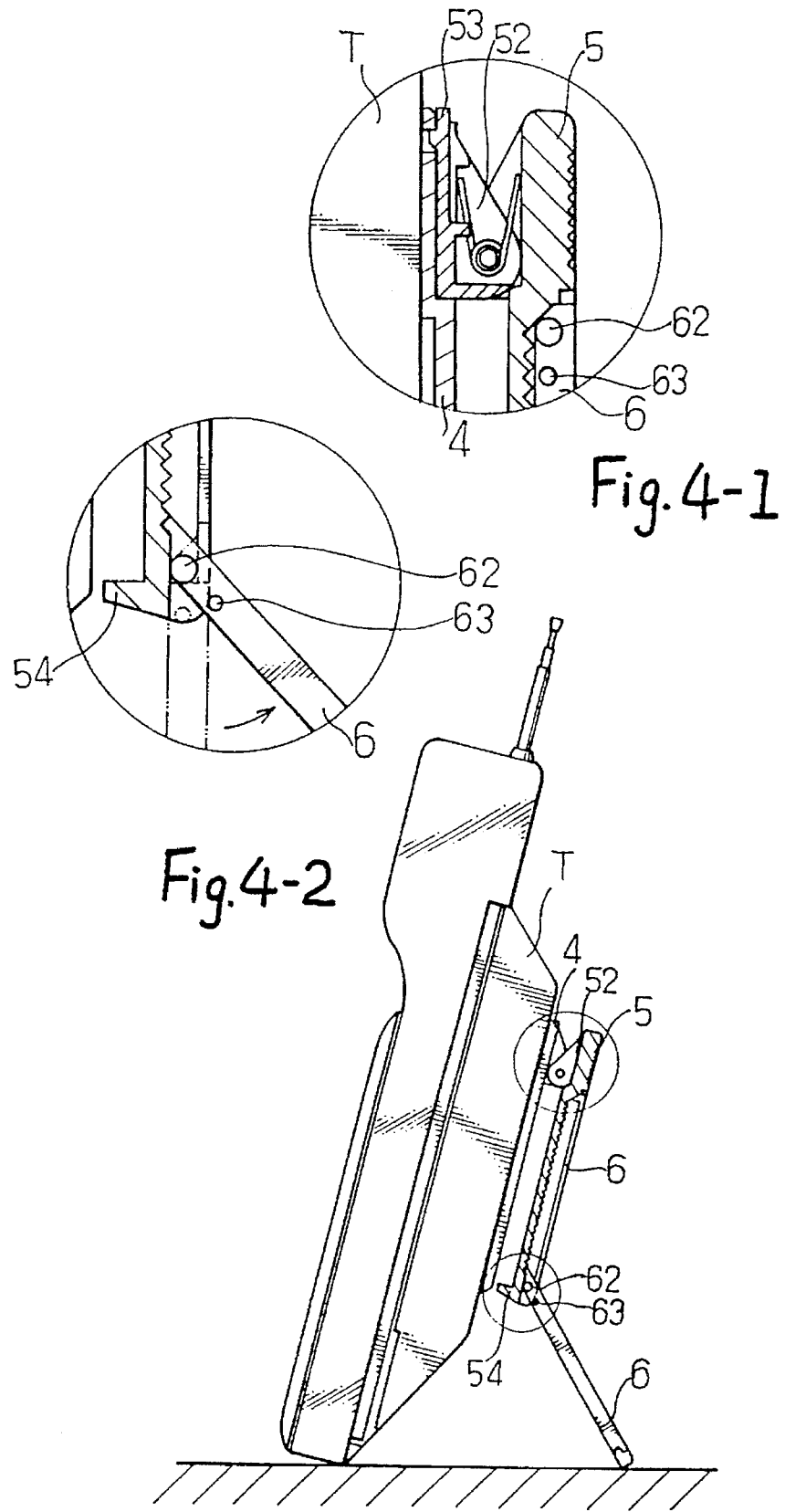

BACK CLIP STRUCTURE OF A MOBILE PHONE

BACKGROUND OF THE INVENTION

The present invention relates to a back clip structure of a mobile phone, which can be used with a mobile phone case and will not affect the charging operation.

FIGS. 1 and 2 show a back clip structure of a conventional mobile phone, including a main body 1, a clip member 2 and a stand 3.

The main body 1 is disposed with a double-side adhesive band 11 on one side for attaching to the mobile phone T and a resilient plate 12 on the other side for associating with the clip member 2.

The clip member 2 is secured to the main body 1 by the resilient plate 12 and protrudes beyond the main body 1. On an inner side of the clip member 2 is disposed a channel 21 for the stand 3 to be inserted thereinto. A reverse hook 22 is disposed at the lower end of the clip member 2 for hanging the same on the user's waist belt.

The stand 3 is connected with the clip member 2 at its top end and has a support plate 31 at its lower end.

When using the back clip structure, the stand 3 inserted in the channel 21 of the clip member 2 is pulled upward so as to enable the mobile phone T to stand. Such structure has the following disadvantages:

1. The back clip is secured to the mobile phone and the back clip has a certain thickness so that the mobile phone cannot be fitted into the case of the mobile phone.

2. The stand determines the height of the mobile phone. This height cannot be adjusted.

3. When charged, the back clip protrudes beyond the main body so that the battery cannot be smoothly engaged with the charger. This affects the charging operation.

SUMMARY OF THE INVENTION

It is therefore a primary object of the present invention to provide a back clip structure for a mobile phone, which can be used with a mobile phone case and will not affect the charging operation. The back clip structure includes a thinner main body, a clip member which can be freely assembled with and disassembled from a restricting seat of the main body, and a stand placed in an inner recess of the clip member to support the mobile phone in an upright position. The stand is slidable along slide channels for height adjustment.

The present invention can be best understood through the following description and accompanying drawings, wherein:

BRIEF DESCRIPTION OF THE DRAWINGS

FIG. 4 is a side view showing that the mobile phone is associated with the present invention and supported by the stand thereof;

FIG. 4-1 is an enlarged view of a part of the present invention; and

FIG. 4-2 is an enlarged view of another part of the present invention.

DETAILED DESCRIPTION OF THE PREFERRED EMBODIMENT

Figure 3:
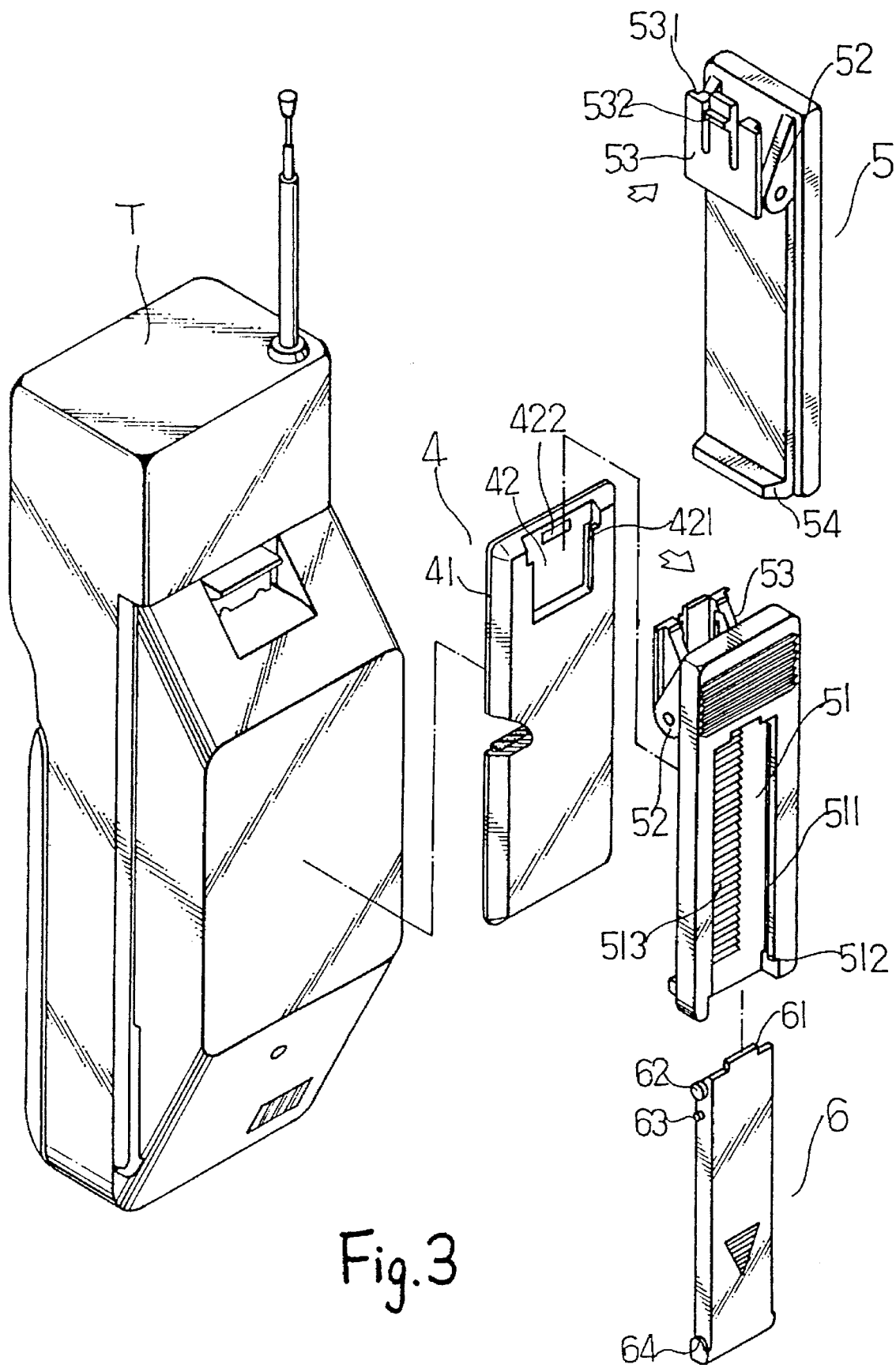
FIG. 3 is a perspective exploded view of the present invention.

Please refer to FIG. 3. The present invention includes a main body 4, a clip member 5 and a stand 6.

The main body 4 has a first face on which a double-side adhesive band 41 is attached for binding the main body 4 with the mobile phone T, and a second face disposed with a restricting seat 42 having an engaging slot 422 and two lateral restricting channels 421 for fitting with the clip member 5.

The clip member 5 has a first face formed with an inner recess 51 for placing, the stand 6 therein and a second face disposed with a support arm 52. The inner recess 51 has two lateral slide channels 511, each channel 511 having a fixing dent 512 at a bottom end thereof. A row of tooth blocks 518 are disposed on the surface of the inner recess 51. A resilient restricting plate 53 is associated with the clip member 5. The restricting plate 53 has a pair of lateral ribs 531 on two sides and a central engagement member 532 for inserting into the slot 422 of the restricting seat 42 of the main body. A reverse hook 54 is disposed at the bottom end of the clip member 5 for hanging the mobile phone on the user's belt.

The stand 6 is placed in the inner recess 51 of the clip member 5, and includes a projection 61 at a top end and a large diameter shaft rod 62 and a small diameter shaft rod 63 on each side. In addition, two fixing blocks 64 are disposed on two sides of a lower end of the stand 6.

According to the above arrangement, when assembled with the mobile phone T, the main body 4 is attached to the mobile phone T by the double-side adhesive band 41 and the restricting plate 53 of the clip member 5 is inserted into the restricting seat 42 with the lateral ribs 531 engaged within the restricting channels 421. The engagement member 532 is inserted into the engaging slot 422 of the restricting seat 42. Accordingly, the clip member 5 can be freely assembled with and disassembled from the main body 4. The shaft rods 62, 68 of the stand 6 are positioned in the slide channels 511 of the clip member 5 with the fixing blocks 64 bridging over the fixing dents 512 of the clip member 5, whereby the stand 6 will not slip downward. The reverse hook 54 of the clip member 5 enables the mobile phone to be directly hung on the user's belt.

Figure 1:
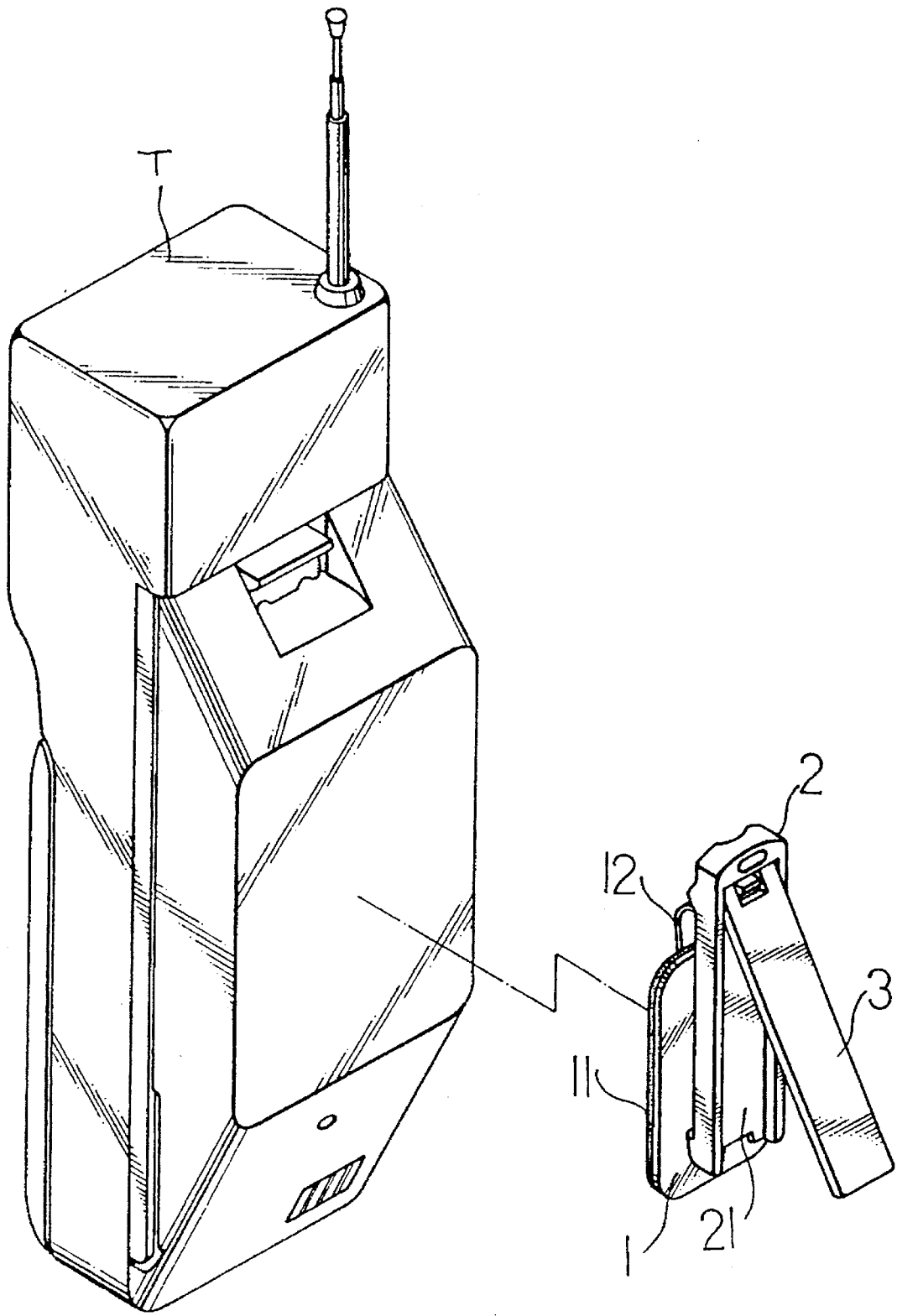
FIG. 1 is a perspective view of a conventional back clip structure of a mobile phone.
Figure 2:
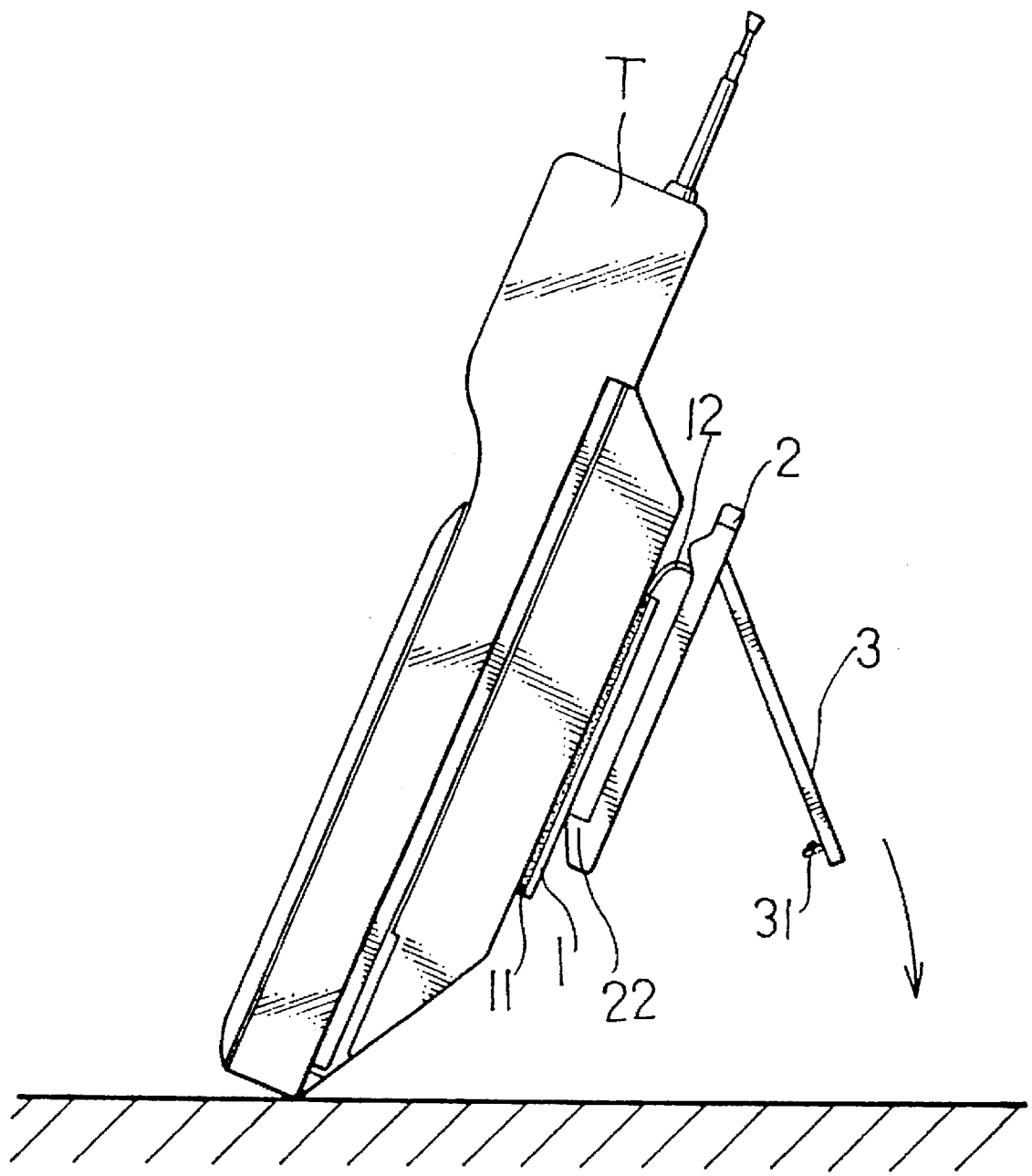
FIG. 2 is a side view showing that the mobile phone is associated with the back clip of FIG. 1 and supported by the stand thereof.

When the user wants to place the mobile phone in an upright state, the bottom end of the stand 6 is pivoted upward from the inner recess 51 of the clip member 5, making the large and small shaft rods 62, 63 of the stand 6 move downward along the slide channels 511 of the clip member 5. When the small shaft rods 63 reach the fixing dents 512, the stand 6 is further pulled outward, making the projection 61 of the stand 6 engage with the tooth blocks 513 of the clip member 5. At this time, the large shaft rods 62 are engaged on the fixing dents 512, while the small shaft rods 68 are engaged with the outer edges of the fixing dents 512 so that the stand 6 is firmly engaged with the clip member as shown in FIGS. 4, 4-1 and 4-2.

When used with the mobile phone case, the engagement member 532 of the restricting plate 53 is taken out of the engaging slot 422 of the main body 1 and the lateral ribs 531 are pushed out upward along the restricting channels 421 so that the main body 4 is disassembled from the clip member 5. Therefore, the mobile phone can be fitted into the mobile phone case. In addition, the main body 4 and the clip member 6 have the same height so that the charging operation will not be affected.

The above embodiments are only some examples of the present invention and the scope of the present invention should not be limited to the examples. Any modification or variation derived from the examples should fall within the scope of the present invention.

What is claimed is:

1. A back clip structure for a mobile phone comprising:

a) a main body including a first face, adhesive means on the first face for securing the main body to the mobile phone, a second face, and a seat formed in a top end of the second face;

b) a clip member including a first face and a second face, the first face of the clip member having a recess formed therein, the recess including an inner surface, a pair of slide channels, a fixing dent at a bottom of each of the slide channel and a tooth block means on the inner surface, the second face of the clip member including a plate and means for detachably engaging the plate within the seat of the main body; and c) a stand including a pair of opposite sides, a projection at a top end of the stand, a fixing block at each of the side adjacent a bottom end of the stand, a rod means, the rod means being slidably engageable within the slide channels of the clip member for permitting the stand to be disposed between a first position of storage wherein the stand is placed within the recess and the fixing blocks of the stand are in engagement with the fixing dents of the clip member, and a second position of use wherein the stand is extended downwardly and outwardly away from the recess with the projection disposed in engagement with the tooth block means and the rod means disposed in engagement with the fixing dents to permit the stand to support the mobile phone in an upright position.

2. The back clip structure of claim 1, wherein:

a) the means for detachably engaging the plate within the seat includes a slot and a pair of channels formed in the seat, and the plate including a pair of lateral ribs, and a resilient engagement, the ribs slidably engageable within the channels of the seat, the resilient engagement member engageable within the slot;

b) the rod means each includes a pair of spaced rods of different diameters; and c) the second face of the clip member further including a reverse hook adjacent a lower end thereof for attachment to a belt of a user.

* * * * *